US005130738A

United States Patent [19]

Hirata

[11] Patent Number: 5,130,738

[45] Date of Patent: Jul. 14, 1992

[54] ELECTRONIC FLASH UNIT DRIVER BY INSULATED GATE BIPOLAR TRANSISTOR

[75] Inventor: Shinji Hirata, Toyonaka, Japan

[73] Assignee: West Electric Co., Ltd., Osaka, Japan

[21] Appl. No.: 704,098

[22] Filed: May 22, 1991

[30] Foreign Application Priority Data

Jun. 18, 1990 [JP] Japan .................................. 2-159051

[51] Int. Cl.$^{5}$ .............................................. G03B 15/05

[52] U.S. Cl. .................................. 354/416; 315/241 P

[58] Field of Search ...................... 354/416, 417, 145.1, 354/149.11, 135; 315/241 P, 340

[56] References Cited

U.S. PATENT DOCUMENTS 4,697,906 10/1987 Kobayashi et al. ................. 354/416
4,839,686 6/1989 Hosomizu et al. .................. 354/416
5,038,080 8/1991 Hirata ................................. 354/416

*Primary Examiner*—W. B. Perkey
*Assistant Examiner*—Cassandra C. Spyrou
*Attorney, Agent, or Firm*—Stevens, Davis, Miller & Mosher

[57] ABSTRACT

An I.G.B.T. (Insulated Gate Bipolar Transistor) driven electronic flash unit includes a control switch for controlling an off-operation of the I.G.B.T. The control switch has a first terminal for receiving a light-emission stopping command of a very short pulse width, a second terminal supplied with a collector electrode voltage of the I.G.B.T. connected in series with a flash tube, third and fourth terminals respectively connected with gate and emitter electrodes of the I.G.B.T., which short-circuits the third and fourth terminals upon receiving the light-emission stopping command at the first terminal, and maintains the short-circuit operation as long as it receives the collector electrode voltage of the I.G.B.T. at the second terminal.

5 Claims, 5 Drawing Sheets

ELECTRONIC FLASH UNIT DRIVER BY INSULATED GATE BIPOLAR TRANSISTOR

BACKGROUND OF THE INVENTION

1. Field of the Invention

This invention relates to an electronic flash unit comprising an insulated gate bipolar transistor (abbreviated hereinafter as an I.G.B.T.) which is connected in series with a flash discharge tube and acts to control the emission of light from the flash tube, and more particularly to an electronic flash unit including a novel drive control system for the I.G.B.T.

2. Description of the Related Art

As one of electronic flash units using such an I.G.B.T., that disclosed in U.S. Pat. No. 4,839,686 is well known in the art.

As shown in FIG. 5, this known electronic flash unit is composed of a high-voltage DC power source 1 in the form of a known DC-DC converter circuit, a main capacitor 2 charged by the power source 1, a constant voltage circuit 3 associated with the power source 1 so as to supply a constant voltage to a light-emission control circuit 7 described later, a known trigger circuit 4 for triggering a flash tube 5, a control circuit 6 which is connected to control means 8 incorporated in a camera body to transmit and receive various signals between them thereby producing various output signals including a trigger signal for operating the trigger circuit 4, a light-emission control circuit 7 for controlling the on-off of the I.G.B.T. connected in series with the flash tube 5 thereby controlling the emission of light from the flash tube 5, and a double voltage circuit 9 for applying a doubled voltage to the flash tube 5.

In operation, when a switch Sw is turned on, the high-voltage DC power source 1 operates so that both the main capacitor 2 and a double voltage capacitor 9a are charged in the illustrated polarities. At the same time, a low-voltage DC power source E charges a power supply capacitor C for the control circuit 6, and the high-voltage DC power source 1 charges also a capacitor 3a in the constant voltage circuit 3.

When a light-emission starting command signal is applied to the control circuit 6 from the control means 8 in the camera body under the condition where the individual capacitors have been fully charged, a high-level trigger signal is generated from one output terminal $O_a$ of the control circuit 6 for a predetermined period in which the longest light emitting period of the flash tube 5 is considered.

As a result, transistors $Q_a$ and $Q_b$ in the light-emission control circuit 7 are turned on, and the voltage charged in the capacitor 3a is applied to the gate of the I.G.B.T. thereby turning on the I.G.B.T. At this time, the other output terminal $O_b$ of the control circuit 6 is maintained at a low potential level, so that a transistor $Q_c$ in the light-emission control circuit 7 is in its off state.

As soon as the I.G.B.T. is turned on, the known trigger circuit 4 operates to trigger or excite the flash tube 5, and, at the same time, the double voltage capacitor 9a is grounded at the plus (+) side through a resistor R1 and the I.G.B.T. The charged voltage of the double voltage capacitor 9a is superposed on that of the main capacitor 2, and the resultant voltage is applied to the flash tube 5.

As a result, the flash tube 5 emits light by consuming the charged energy of the main capacitor 2.

When, in the course of the emission of light from the flash tube 5, a light-emission stopping command pulse is applied to the control circuit 6 from, for example, a photometer circuit incorporated in the control means 8, a high-level light-emission stopping command signal is generated from the output terminal $O_b$ of the control circuit 6 thereby turning on the transistors $Q_c$ and $Q_d$ in the light-emission control circuit 7.

Due to the turning-on of the transistors $Q_c$ and $Q_d$, the transistor $Q_a$ is short-circuited between its base and emitter, and the I.G.B.T. is also short-circuited between its gate and emitter, with the result that these transistors are turned off. Thus, the transistor $Q_b$ is also turned off. Therefore, the flash tube 5 stops the emission of light.

The operation described above is the basic operation of the prior art electronic flash unit shown in FIG. 5. The electronic flash unit is advantageous in that it operates without excess emission of light as compared to that using a terminating capacitor for stopping the emission of light. The electronic flash unit is also advantageous in that it can repeatedly emit light at a high speed, and it has a reduced size.

However, the I.G.B.T. turning-off system of the prior art electronic flash unit shown in FIG. 5 is such that a high-level light-emission stopping command signal from the output terminal $O_b$ of the control circuit 6 is applied to the system to turn off the I.G.B.T.

When the condition required for the high-level light-emission stopping command signal is considered, it is apparent that such a high-level signal must be continuously generated until the I.G.B.T. is completely turned off.

Thus, the control circuit 6 is required to include a so-called pulse generator circuit which generates such a high-level signal having a predetermined pulse width. Therefore, the prior art electronic flash unit is disadvantageous from the aspect of cost and also from the aspect of energy consumption.

SUMMARY OF THE INVENTION

It is an object of the present invention to provide an electronic flash unit comprising a drive control system of a simple structure which does not require a pulse generator circuit generating pulses having a predetermined pulse width and yet which can reliably tun off an I.G.B.T.

Another object of the present invention is to provide an electronic flash unit comprising a drive control system including control switch means which operates to start to turn off the I.G.B.T. in response to the application of a pulse signal having a very short pulse width and which maintains its operation by receiving the collector voltage supplied from the collector of the I.G.B.T. during a de-ionized time of the flash tube initiated by the turning-off of the I.G.B.T.

DESCRIPTION OF THE PREFERRED EMBODIMENTS

Figure 1:
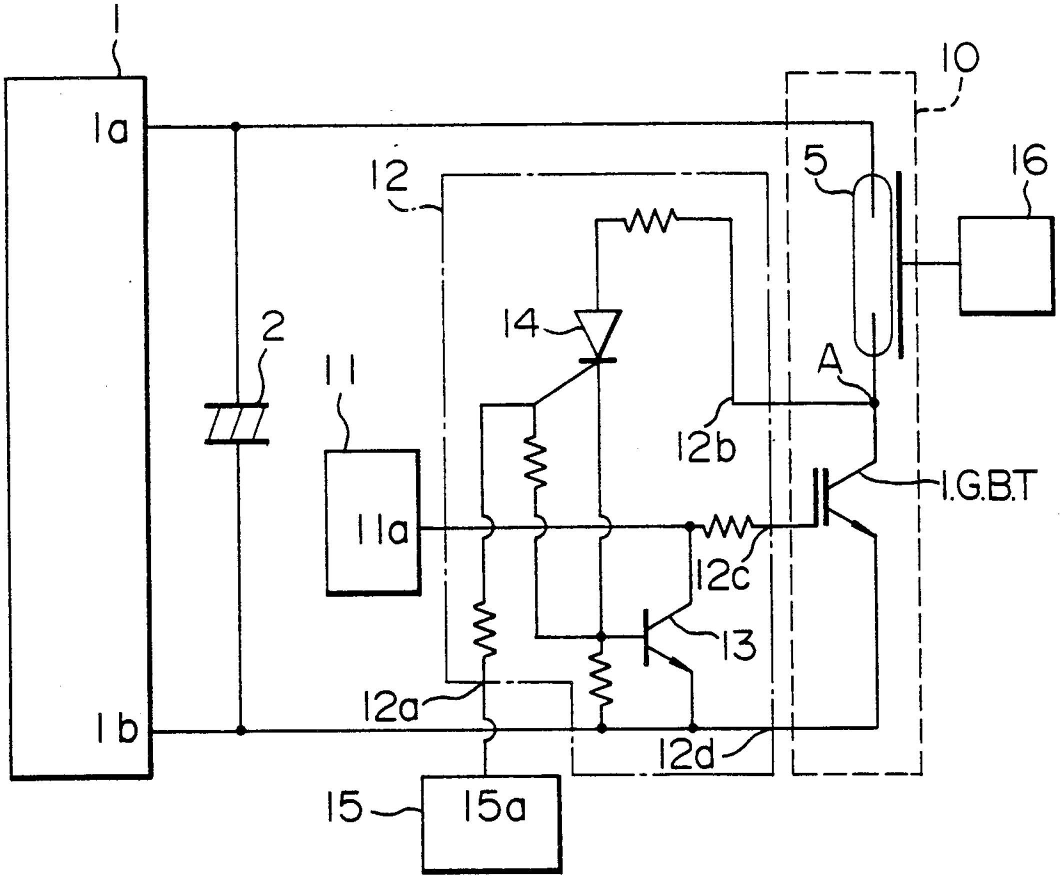
FIG. 1 is an electrical circuit diagram showing the structure of an embodiment of the electronic flash unit according to the present invention.
Figure 5:
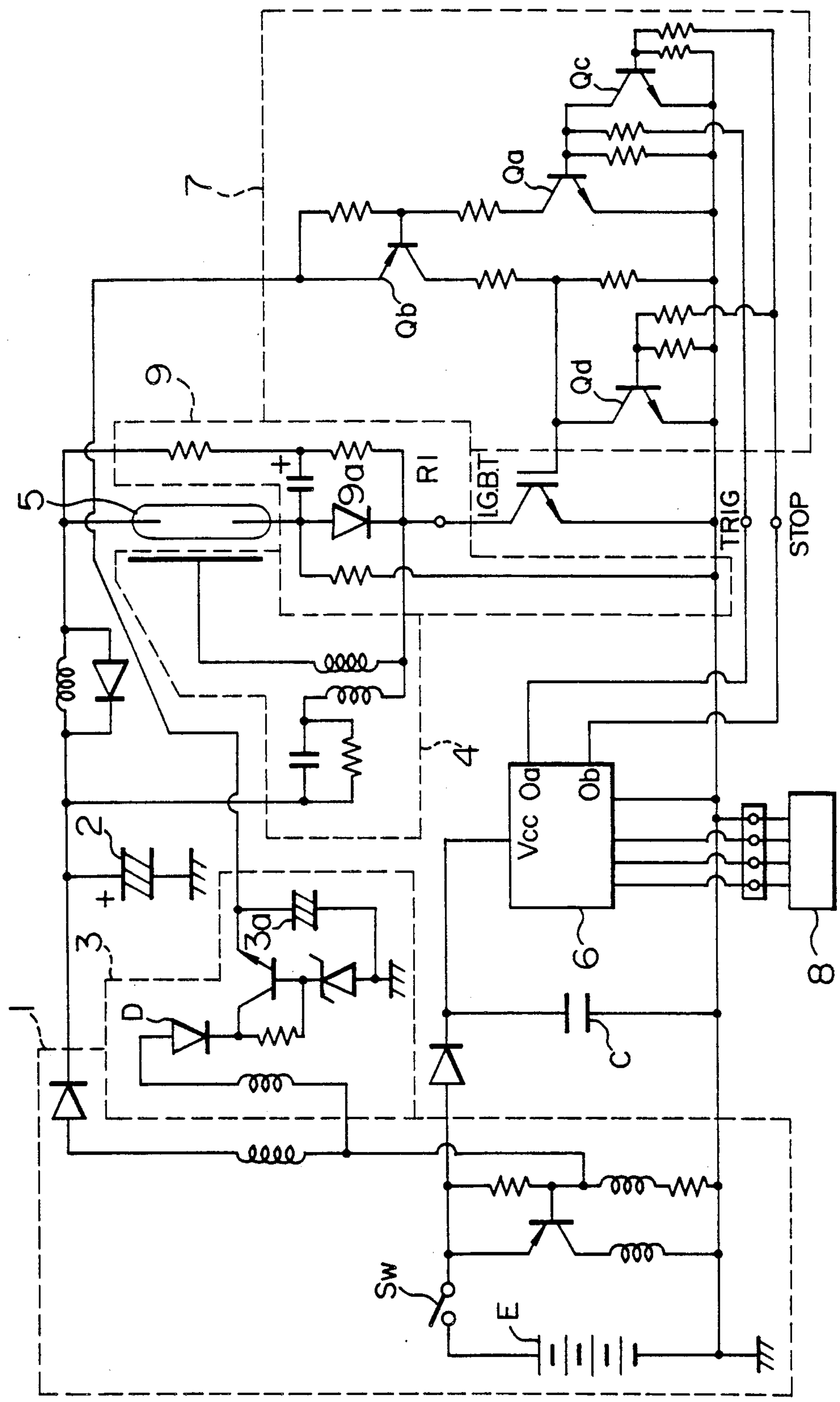
FIG. 5 PRIOR ART
FIG. 5 is an electrical circuit diagram showing the structure of an electronic flash unit disclosed in, for example, U.S. Pat. No. 4,839,686.

FIG. 1 is an electrical circuit diagram showing the structure of an embodiment of the electronic flash unit according to the present invention, and, in FIG. 1, the same reference numerals are used to designate the same or equivalent parts appearing in FIG. 5.

Referring to FIG. 1, a main capacitor 2 is connected across output terminals 1a and 1b of a high-voltage DC power source 1 such as a known DC-DC converter circuit or a laminated battery. Connected across the main capacitor 2 is a series connection 10 consisting of a flash tube 5 and an I.G.B.T. connected in series.

A drive power source 11 generates a suitable predetermined voltage (referred to hereinafter as an on-voltage) for turning on the I.G.B.T., and such an on-voltage appears at its voltage output terminal 11*a*. The I.G.B.T. is connected at its gate to the voltage output terminal 11*a* of the drive power source 11. The on-voltage for turning on the I.G.B.T. may be generated from the drive power source 11 at the time at which a trigger circuit 16 (described later) similar to that incorporated in the prior art electronic flash unit shown in FIG. 5 starts to operate or at the time at which the high-voltage DC power source 1 starts to operate. In the following description, it is assumed that the on-voltage for turning on the I.G.B.T. is generated from the drive power source 11 in synchronism with or in timed relation with the operation starting time of the trigger circuit 16.

Control switch means 12 is a means for turning off the I.G.B.T. when it operates. This control switch means 12 has a first terminal 12*a* to which a light-emission stopping command signal having a very short pulse width is applied, a second terminal 12*b* to which the collector voltage is supplied from the collector of the I.G.B.T., a third terminal 12*c* which is connected to the gate of the I.G.B.T., and a fourth terminal 12*d* which is connected to the emitter of the I.G.B.T.

More concretely, the control switch means 12 is composed of a transistor 13, an SCR 14, and a plurality of resistors not designated by reference numerals in FIG. 1. The transistor 13 is a control switching element which is connected across the gate and the emitter of the I.G.B.T. to form the third and fourth terminals 12*c* and 12*d* described above and which, when turned on, acts to turn off the I.G.B.T. The SCR 14 is also a control switching element which is connected across the connection point A between the flash tube 5 and the I.G.B.T. and the base, that is, the control electrode of the transistor 13 to form the second terminal 12*b* described above and which, when turned on, supplies a base current to the transistor 13.

A light-emission stopping command signal generator circuit 15 generates the light-emission stopping command signal which is a pulse signal having a very short pulse width and used for stopping the emission of light from the flash tube 5. The gate, that is, the control electrode of the SCR 14 is connected to an output terminal 15*a* of the circuit 15 to form the first terminal 12*a* described above. The light-emission stopping command signal generator circuit 15 may be, for example, a photometer circuit which operates when the flash tube 5 emits a proper quantity of light, and such a photometer circuit may be preferably employed.

A trigger circuit 16 operates in response to the application of, for example, a light-emission starting command signal and acts to trigger or excite the flash tube 5. A double voltage circuit (not shown) may be additionally provided as in the case of the prior art flash unit shown in and described by reference to FIG. 5.

The operation of the electronic flash unit embodying the present invention and having the structure described above will now be described by reference to FIGS. 2A to 2E showing signal waveforms appearing at predetermined points in the circuit shown in FIG. 1.

When now the high-voltage DC power source 1 starts to operate by turning on, for example, a suitable power supply switch (not shown), a high DC voltage appearing across the output terminals 1*a* and 1*b* of the power source 1 starts to charge the main capacitor 2 and other capacitors until the capacitors are fully charged.

Figures 2A, 2B, 2C, 2D, 2E:
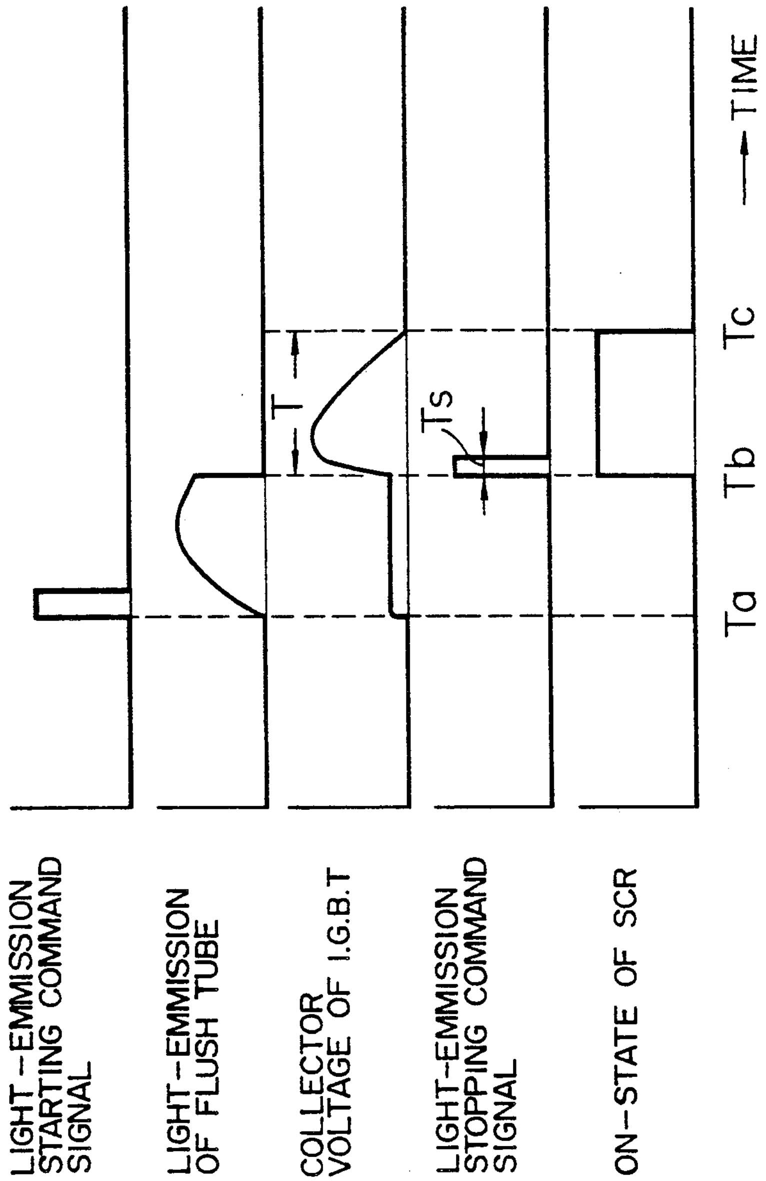
FIGS. 2A to 2E show signal waveforms appearing at predetermined points in the circuit shown in FIG. 1.

At time $T_a$, the light-emission starting command signal in the form of a high-level pulse signal as shown in FIG. 2A is applied to the trigger circuit 16, and the trigger circuit 16 operates to trigger or excite the flash tube 5.

At the same time, the drive power source 11 starts to operate and generates the on-voltage for turning on the I.G.B.T. This on-voltage is supplied from the output terminal 11*a* of the drive power source 11 to the gate of the I.G.B.T.

As a result, the I.G.B.T. is turned on, and the flash tube 5 emits light from the time $T_a$ as shown in FIG. 2B by consuming the charged energy of the main capacitor 2.

At this time, the collector voltage of the I.G.B.T., as shown in FIG. 2C, appears at the connection point A between the flash tube 5 and the I.G.B.T., and this collector voltage is applied to the second terminal 12*b* of the control switch means 12 connected to the connection point A.

Suppose that the flash discharge tube 5 emits a proper quantity of light at, for example, time $T_b$. At this time $T_b$, the light-emission stopping command signal generator circuit 15 operates and generates the light-emission stopping command signal from its output terminal 15*a*. This light-emission stopping command signal is in the from of a high-level pulse signal having a very short pulse width $T_s$ as shown in FIG. 2D. This high-level pulse signal is applied to the first terminal $12_a$ of the control switch means 12, hence to the gate of the SCR 14.

As described already, the SCR 14 is connected at its anode to the second terminal $12_b$ of the control switch means 12 to receive the collector voltage of the I.G B.T. Therefore, the SCR 14 is turned on at the time $T_b$.

As soon as the SCR 14 is turned on, the base current of the transistor 13 constituting the control switch means 12 together with the SCR 14 is supplied to the transistor 13 through the SCR 14. Therefore, this transistor 13 is also turned on at the time $T_b$ as shown in FIG. 2E. Thus, the control switch means 12 starts to operate, and a controlled low potential level is maintained between the third and fourth terminals 12*c* and 12*d* of the control switch means 12. As a result, the I.G.B.T. is short-circuited between its gate and emitter through the resistors, and the I.G.B.T. is turned off at the time $T_b$.

As soon as the I.G.B.T. is turned off, no discharge current flows in the flash tube 5, and the flash tube 5 stops the emission of light at the time $T_b$ as shown in FIG. 2B.

In this case, the flash tube 5 does not return to its steady state immediately after the emission of light has stopped because it is necessary a lapse of an appropriate time for inner gas of the flash tube 5 to return to a non-excited state from its excited state. Therefore, the collector voltage of the I.G.B.T. rises sharply at the turning-off time $T_b$ of the I.G.B.T., in response to an impedance change in the flash tube 5 within the aforementioned de-ionized time T, and then, gradually decreases to its zero level at the time $T_c$ of returning to the steady state, as shown in FIG. 2C.

Therefore, once the SCR 14 in the control switch means 12 incorporated in the illustrated embodiment is turned on, the SCR 14 is maintained in its on sate in the period T in which the I.G.B.T. continuously supplies a sufficient collector voltage required for turning on the SCR 14 regardless of whether or not the gate signal is applied to the gate of the SCR 14. As a result, the transistor 13 to which the base current is supplied through the SCR 14 maintains its on state too in response to the on state of the SCR 14.

The collector voltage of the I.G.B.T. disappears at the end of the period T, that is, at the time $T_c$ as shown in FIG. 2E. At this time $T_c$, both the SCR 14 and the transistor 13 are restored to their off state from their on state. That is, the control switch means 12 ceases its operation, so that the I.G.B.T. is released from the state short-circuited between its gate and emitter.

Thus, the electronic flash unit is restored to the original state not emitting light, and one light emission cycle ends at the time $T_c$.

Figure 3:
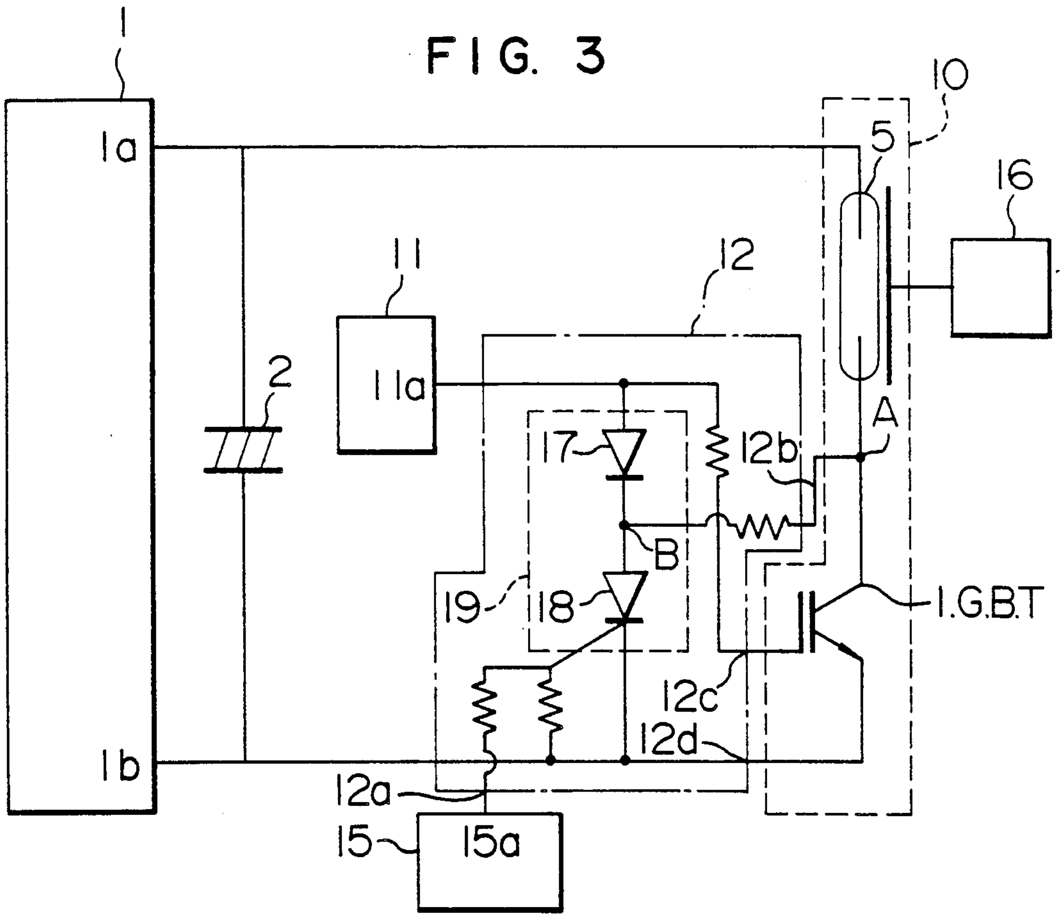
FIG. 3 is an electrical circuit diagram showing the structure of another embodiment of the electronic flash unit according to the present invention.

FIG. 3 is an electrical circuit diagram showing the structure of another embodiment of the electronic flash unit according to the present invention, and, in FIG. 3, the same reference numerals are used to designate the same functional parts appearing in FIG. 1.

It will be apparent from FIG. 3 that this second embodiment is a partial modification of the first embodiment in that the control switch means 12 is composed of a diode 17, an SCR 18 and resistors not designated by reference numerals, instead of the combination of the transistor 13, the SCR 14 and the resistors shown in FIG. 1.

Referring to FIG. 3, the SCR 18 is connected at its control electrode to the first terminal 12a to which a light-emission stopping command signal having a very short pulse width is applied. The SCR 18 and the diode 17 are connected in series to constitute a control series connection 19 connected across the gate and the emitter of the I.G.B.T. The third and fourth terminals 12c and 12d of the control switch means 12 are provided by this control series connection 19.

The connection point B between the diode 17 and the SCR 18 is connected to the connection point A between the flash tube 5 and the I.G.B.T. thereby providing the second terminal 12b of the control switch means 12.

The operation of the second embodiment having the aforementioned structure will now be described. The second embodiment differs from the first embodiment in the structure of the control switch means 12 only, and the operation of the second embodiment of the electronic flash unit is basically the same as that of the first embodiment.

In operation, the main capacitor 2 is fully charged by the function of the high-voltage DC power source 1. Then, when a light-emission starting command signal in the form of a high-level pulse signal is applied to the trigger circuit 16, the trigger circuit 16 operates to trigger or excite the flash tube 5 as in the case of the first embodiment shown in FIG. 1. At the same time, the drive power source 11 starts to operate and generates the on-voltage for turning on the I.G.B.T. This on-voltage is supplied from the output terminal 11a of the drive power source 11 to the gate of the I.G.B.T.

Therefore, the I.G.B.T. is turned on, and the flash tube 5 emits light by consuming the charged energy in the main capacitor 2.

At this time, the collector voltage of the I.G.B.T. appears at the connection point A between the flash tube 5 and the I.G.B.T., as described in the first embodiment, and this collector voltage is applied to the second terminal 12b of the control switch means 12 connected to the connection point A.

Suppose that the flash tube 5 emits a proper quantity of light at an appropriate time. At this time, the light-emission stopping command signal generator circuit 15 operates and generates the light-emission stopping command signal from its output terminal 15a. This light-emission stopping command signal is in the form of a high-level pulse signal having a very short pulse width, and this high-level pulse signal is applied to the first terminal 12a of the control switch means 12, hence to the gate of the SCR 18.

On the other hand, the SCR 18 is connected at its anode to the second terminal 12b of the control switch means 12. Therefore, as in the case of the first embodiment, the SCR 18 is turned on by the collector voltage supplied from the I.G.B.T. and appearing at the connection point A between the flash tube 5 and the I.G.B.T. at the time of generation of the light-emission stopping command signal.

As soon as the SCR 18 is turned on, a controlled low potential level is maintained between the third and fourth terminals 12c and 12d of the control switch means 12, that is, across the control series connection 19 formed of the combination of the SCR 18 and the diode 17. Thus, the control switch means 12 starts to operate. As a result, the I.G.B.T. is short-circuited between its gate and emitter through the resistors, and the I.G.B.T. is turned off at that time.

As soon as the I.G.B.T. is turned off, no discharge current flows in the flash tube 5, and the flash tube 5 stop the emission of light.

In this case, the collector voltage of the I.G.B.T. gradually decreases to its zero level after it sharply increases at the turning-off time of the I.G.B.T., as described in the first embodiment. Therefore, the SCR 18 in this second embodiment too operates in a manner entirely similar to that of the SCR 14 in the first embodiment. More precisely, once the SCR 18 is turned on, the SCR 18 is maintained in its on state in the period in which the I.G.B.T. continuously supplies a sufficient collector voltage required for turning on the SCR 18 regardless of whether or not the gate signal is applied to the gate of the SCR 18. As a result, the operation of the control switch means 12 is maintained in response to the on state of the SCR 18.

The collector voltage of the I.G.B.T. disappears at the end of the period described above. At this time, the SCR 18 is restored to its off state from its on state. As a result, the control switch means 12 ceases its operation, so that the I.G.B.T. is released from the state short-circuited between its gate and emitter. Thus, the electronic flash unit is restored to the original state not emitting light, and one light emission cycle ends at that time.

Figure 4A:
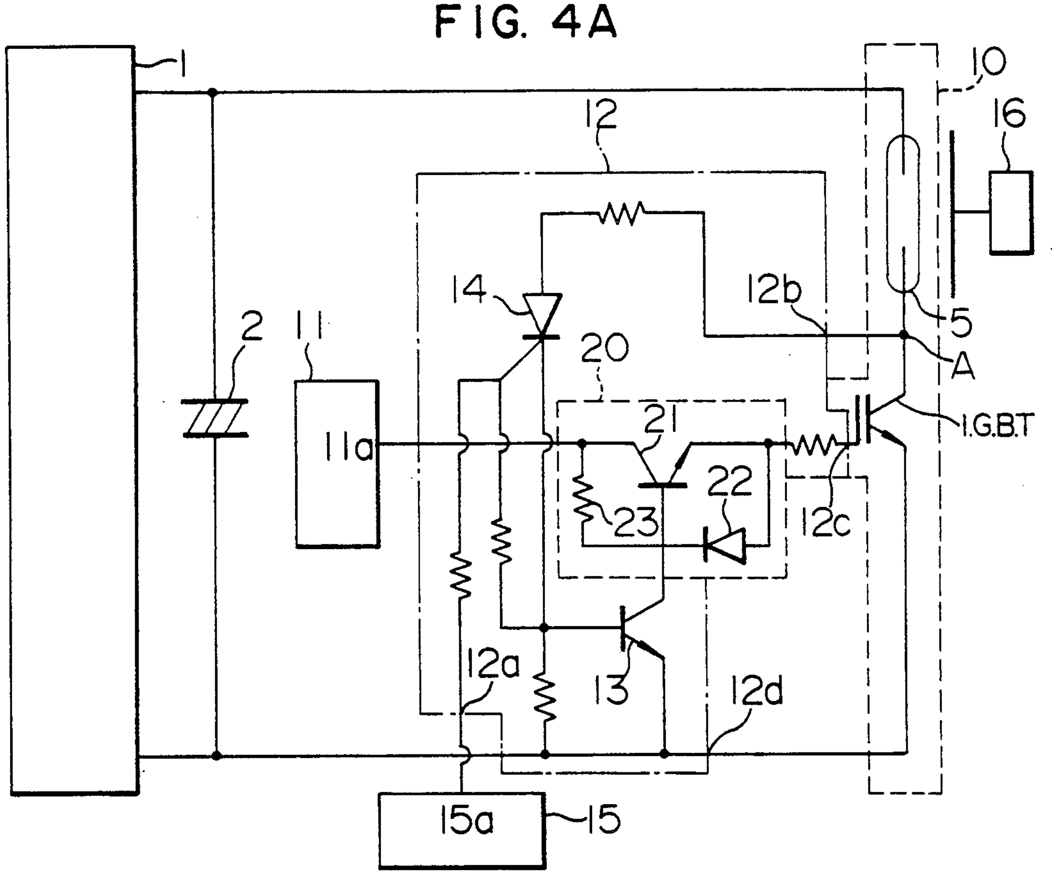
FIGS. 4A and 4B are electrical circuit diagrams showing the structure of other embodiments of the electronic flash unit according to the present invention.
Figure 4B:
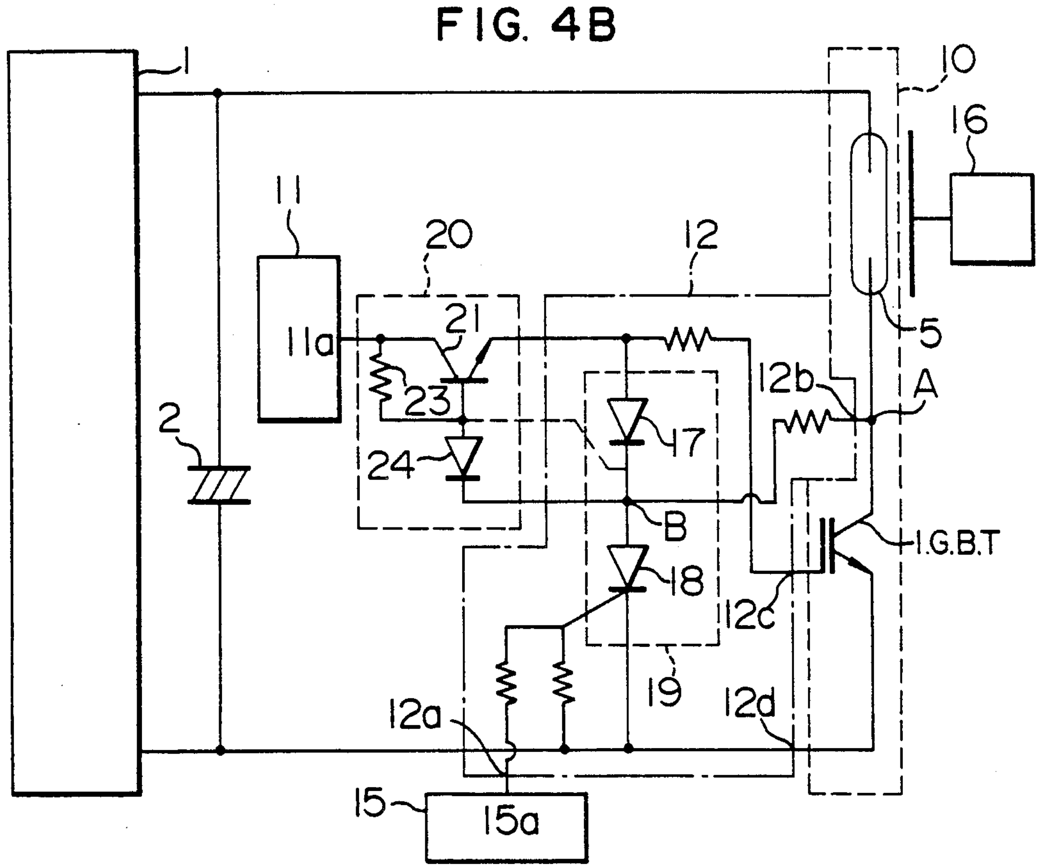

FIGS. 4A and 4B are electrical circuit diagrams showing the structure of other embodiments of the electronic flash unit according to the present invention, and, in FIGS. 4A and 4B, the same reference numerals are used to designate the same functional parts appearing in FIGS. 1 and 3 respectively.

It will be seen from FIGS. 4A and 4B that the third embodiment shown in FIG. 4A corresponds to the first embodiment shown in FIG. 1, and fourth embodiment shown in FIG. 4B corresponds to the second embodiment shown in FIG. 3. More concretely, switching means 20 composed of a transistor 21, a diode 22 and a resistor 23 is additionally provided in the third embodiment which is a modification of the first embodiment, and switching means 20 composed of a transistor 21, a resistor 23 and a diode 24 is additionally provided in the fourth embodiment which is a modification of the second embodiment.

That is, in the switching means 20 used in the third embodiment shown in FIG. 4A, the transistor 21, which is a control switching element, is connected at its main electrodes across the output terminal 11*a* of the drive power source 11 and the gate of the I.G.B.T. and at its control electrode, that is, the base to the collector of the transistor 13 in the control switch means 12 used in the first embodiment shown in FIG. 1. The resistor 23 is connected across the output terminal 11*a* of the drive power source 11 and the base of the transistor 21, and the diode 22 is connected at its anode to the gate of the I.G.B.T. and at its cathode to the base of the transistor 21. By the operation of the transistor 21 based on the operation of the transistor 13, the mode of connection between the output terminal 11*a* of the drive power source 11 and the gate of the I.G.B.T. is controlled so as to control the on-voltage supplied from the output terminal 11*a* of the drive power source 11 to the gate of the I.G.B.T. for turning on the I.G.B.T.

In the switching means 20 used in the fourth embodiment shown in FIG. 4B, the transistor 21, which is a control switching element, is connected at its main electrodes across the output terminal 11*a* of the drive power source 11 and the gate of the I.G.B.T. in the second embodiment shown in FIG. 3, and the resistor 23 is connected across the output terminal 11*a* of the drive power source 11 and the base of the transistor 21. The diode 24 is connected at its anode to the base of the transistor 21 and at its cathode to the anode of the SCR 18 in the control series connection 19 used in the second embodiment. By the operation of the transistor 21 based on the operation of the SCR 18, the mode of connection between the output terminal 11*a* of the drive power source 11 and the gate of the I.G.B.T. is controlled so as to control the on-voltage supplied from the output terminal 11*a* of the drive power source 11 to the gate of the I.G.B.T. for turning on the I.G.B.T.

The operations of the third and fourth embodiments will now be described. The operations of the third and fourth embodiments differ from those of the first and second embodiments in the manner of operation of the additionally provided switching means 20 only, and the operations of the third and fourth embodiments of the electronic flash unit are basically the same as those of the first and second embodiments respectively.

In the third embodiment shown in FIG. 4A, the main capacitor 2 is fully changed by the function of the high-voltage DC power source 1. Then, when a light-emission starting command signal in the form of a high-level pulse signal is applied to the trigger circuit 16, the trigger circuit 16 operates to trigger or excite the flash tube 5, as in the case of the first embodiment shown in FIG. 1. At the same time, the drive power source 11 starts to operate and generates the on-voltage for turning on the I.G.B.T.

This on-voltage generated from the output terminal 11*a* of the drive power source 11 is applied through the resistor 23 across the base and the emitter of the transistor 21 to supply the base current to the transistor 21 thereby turning on the transistor 21. That is, the switching means 20 starts to operate, and, as a result, the on-voltage is supplied from the drive power source 11 to the gate of the I.G.B.T.

Therefore, the I.G.B.T. is turned on, and the flash tube 5 emits light by consuming the charged energy in the main capacitor 2, as in the case of the first embodiment. At this time, the collector voltage of the I.G.B.T. appears at the connection point A between the flash tube 5 and the I.G.B.T., and this collector voltage is applied to the second terminal 12*b* of the control switch means 12 connected to the connection point A.

Suppose that the flash tube 5 emits a proper quantity of light at an appropriate time. At this time, the light-emission stopping command signal generator circuit 15 operates and generates the light-emission stopping command signal from its output terminal 15*a*. This light-emission stopping command signal is in the form of a high-level pulse signal having a very short pulse width and is applied to the first terminal 12*a* of the control switch means 12. Therefore, as in the case of the first embodiment, the SCR 14 is turned on at the time described above, thereby turning on the transistor 13.

As soon as the transistor 13 is turned on, a controlled low potential level is maintained at the collector of the transistor 13, and the control switch means 12 operates. As a result, a low potential level is maintained at the base of the transistor 21, and the I.G.B.T. is short-circuited between its gate and emitter through the diode 22 and the resistors. Thus, both the transistor 21 and the I.G.B.T. are turned off.

As soon as the transistor 21 is turned off, the gate of the I.G.B.T. is electrically disconnected from the output terminal 11*a* of the drive power source 11, unlike the case of the first embodiment. Also, because the I.G.B.T. is turned off, no discharge current flows in the flash tube 5, and the flash tube 5 stops the emission of light, as in the case of the first embodiment.

Thus, once the SCR 14 is turned on, the SCR 14 is maintained in its on state in the period in which the I.G.B.T. continuously supplies a sufficient collector voltage required for turning on the SCR 14, as in the case of the first embodiment. As a result, the control switch means 12 continues to operate in response to the on state of the SCR 14, and the transistor 21 is maintained in its off state. Also, the I.G.B.T. is maintained in the state short-circuited between its gate and emitter.

Then, the collector voltage of the I.G.B.T. disappears at the end of the period described above. At this time, the SCR 14 is restored to its off state from its on state, and the control switch means 12 ceases its operation. As a result, the state in which the base of the transistor 21 is maintained at a low potential level, and the I.G.B.T. is short-circuited between its gate and emitter is released. Thus, the electronic flash unit is restored to the original state not emitting light, and one light emission cycle ends at that time.

In the case of the fourth embodiment shown in FIG. 4B too, when the light-emission starting command signal is applied to the trigger circuit 16 after the main capacitor 2 is fully charged, the trigger circuit 16 triggers or excites the flash tube 5, and, at the same time, the on-voltage for turning on the I.G.B.T. is generated from the output terminal 11*a* of the drive power source 11, as in the case of the third embodiment shown in FIG. 4A.

Therefore, as in the case of the third embodiment, the on-voltage generated from the drive power source 11 supplies the base current to the transistor 21 through the resistor 23 thereby turning on the transistor 21, and the switching means 20 starts to operate to supply the on-voltage generated from the drive power source 11 to the gate of the I.G.B.T.

As a result, the I.G.B.T. is turned on, and the flash tube 5 emits light by consuming the charged energy in the main capacitor 2. At the same time, the collector voltage of the I.G.B.T. appears at the point A in FIG. 4B. This collector voltage is applied to the anode of the SCR 18. However, this collector voltage is not applied to the base of the transistor 21 by the function of the reverse-current preventing diode 24.

Suppose that the flash tube 5 emits a proper quantity of light at an appropriate time. At this time, the light-emission stopping command signal having a very short pulse width is applied to the gate of the SCR 18 so as to turn on the SCR 18, hence to start operation of the control switch means 12, as in the case of the second embodiment shown in FIG. 3, and a controlled low potential level is maintained across the control series connection 19 and at the cathode of the diode 24. As a result, a low potential level is maintained at the base of the transistor 21, and the I.G.B.T. is short-circuited between its gate and emitter through the control series connection 19 and the resistors, so that both the transistor 21 and the I.G.B.T. are turned off.

Therefore, as in the case of the third embodiment shown in FIG. 4A, the gate of the I.G.B.T. is electrically disconnected from the output terminal 11*a* of the drive power source 11, and no discharge current flows in the flash tube 5, with the result that the flash tube 5 stops the emission of light.

Once the SCR 18 is turned on, the SCR 18 is maintained in its on state in the period in which the collector voltage of the I.G.B.T. is continuously supplied, as in the case of the second embodiment As a result, in response to the on state of the SCR 18, the transistor 21 is maintained in its off state, and the I.G.B.T. is also maintained in the state short-circuited between its gate and emitter, as in the case of the second embodiment.

Then, the collector voltage of the I.G.B.T disappears at the end of the period described above. At this time, the SCR 18 is restored to its off state from its on state as in the case of the third embodiment shown in FIG. 4A. As a result, the transistor 21 is released from the state in which its base is maintained at a low potential level, and the I.G.B.T. is also released from the state short-circuited between its gate and emitter. Thus, the electronic flash unit is restored to the original state not emitting light, and one light emission cycle ends at that time.

As will be apparent from the above description of the operations of the third and fourth embodiments shown in FIGS. 4A and 4B, respectively, the gate of the I.G.B.T. is electrically disconnected from the output terminal 11*a* of the drive power source 11 when the I.G.B.T. is short-circuited between its gate and emitter by the function of the control switch means 12.

The drive power source 11 used in the third and fourth embodiments differs from the power source shown in FIG. 5 in which the supply of the I.G.B.T. on-voltage to the gate of the I.G.B.T. is started by the function of the trigger circuit 4 and is stopped in response to the light-emission stopping command signal The drive power source 11 used in the third and fourth embodiments is such that the I.G.B.T. on-voltage is generated in response to the operation of the high-voltage DC power source 1, and the supply of the I.G.B.T. on-voltage to the gate of the I.G.B.T. is started. That is, the drive power source 11 continuously supplies the I.G.B.T. on-voltage to the gate of the I.G.B.T. when the high-voltage DC power source 1 is placed in operation by turning on the power supply switch (not shown). Therefore, the third and fourth embodiments are advantageous in that the output terminal 11*a* of the drive power source 11 is not short-circuited at the time of the short-circuit between the gate and the emitter of the I.G.B.T.

In other words, as will be apparent from FIGS. 1 and 3 showing the first and second embodiments respectively, the transistor 13 or the control series connection 19 in the control switch means 12 may act to short-circuit the output terminal 11*a* of the drive power source 11 at the time of the short-circuit between the gate and the emitter of the I.G.B.T. Thus, when a power source of the kind continuously supplying the I.G.B.T. on-voltage is used as the drive power source 11, an undesirable situation that is the short-circuit of the output terminal 11*a* of the drive power source 11 may arise. Therefore, some kind of preventive means for preventing the undesirable short-circuit of the output terminal 11*a* of the driven power source 11 is inevitably required as a matter of fact. It can be said that each of the third and fourth embodiments shown in FIGS. 4A and 4B respectively includes one form of such a preventive means.

It will be understood from the foregoing detailed description that the electronic flash unit according to the present invention comprises control switch means which acts to start short-circuit of the gate and the emitter of an I.G.B.T. in response to the application of a light-emission stopping command signal and which maintains the short-circuit operation by receiving the collector voltage from the I.G.B.T. Therefore, the electronic flash unit is advantageous in that the I.G.B.T. can be turned off by a drive control system of a simple structure that does not require a pulse generator circuit generating a pulse signal having a predetermined pulse width.

The electronic flash unit according to the present invention further comprises means for preventing undesirable short-circuit of an output terminal of a drive power source generating an I.G.B.T. on-voltage which is continuously supplied to the gate of the I.G.B.T. during the operation of the flash unit and the supply of which is controlled by the control switch means. Therefore, the electronic flash unit is also advantageous in that occurrence of an undesirable situation that is the undesirable short-circuit of the output terminal of the drive power source in the off state of the I.G.B.T. can be reliably prevented.

I claim:

1. An electronic flash unit comprising:

a high-voltage DC power source;

a main capacitor connected across said high-voltage DC power source to be charged by said high-voltage DC power source;

a series connection of a flash tube and an insulated gate bipolar transistor having a gate, a collector and an emitter, said series connector being connected across said main capacitor;

a drive power source generating an on-voltage for turning on said insulated gate bipolar transistor and supplying said on-voltage from a voltage output terminal of said drive power source to the gate of said insulated gate bipolar transistor;

control switch means having at least a first terminal to which a light-emission stopping command signal having a very short pulse width is applied, a second terminal to which a voltage of said collector of said insulated gate bipolar transistor is supplied, a third terminal which is connected to the gate of said insulated gate bipolar transistor, and a fourth terminal which is connected to the emitter of said insulated gate bipolar transistor, said control switch means starting a short-circuit operation for short-circuiting between the gate and the emitter of said insulated gate bipolar transistor in response to application of said light-emission stopping command signal and maintaining the short-circuit operation by receiving the voltage of said collector of said insulated gate bipolar transistor; and a trigger circuit operating to excite said flash tube.

2. An electronic flash unit according to claim 1, wherein said control switch means includes:

a first control switching element having a control electrode and main electrodes connected across the gate and the emitter of said insulated gate bipolar transistor; and a second control switching element having a control electrode to which said light-emission stopping command signal having the very short pulse width is applied and main electrodes connected across a connection point between said flash tube and said insulated gate bipolar transistor and said control electrode of said first control switching element.

3. An electronic flash unit according to claim 1, wherein said control switch means includes a control series connection formed by connecting a diode in series with a third control switching element having a control electrode to which said light-emission stopping command signal having the very short pulse width is applied, said control series connection being connected across the gate and the emitter of said insulated gate bipolar transistor, and a connection point between said diode and said third control switching element forming said control series connection is connected to a connection point between said flash discharge tube and said insulated gate bipolar transistor.

4. An electronic flash unit according to claim 2, wherein said control switch means further includes:

a fourth control switching element having a control electrode and main electrodes connected across the voltage output terminal of said drive power source and the gate of said insulated gate bipolar transistor;

a second diode having an anode connected to the gate of said insulated gate bipolar transistor and a cathode connected to said control electrode of said fourth control switching element; and a resistor connected across the voltage output terminal of said drive power source and the control electrode of said fourth control switching element, and wherein said control switch means controls (i) supply of on-voltage from the voltage output terminal of said drive power source to the gate of said insulated gate bipolar transistor in accordance with an operating state of said first control switching element and (ii) short-circuiting between the gate and the emitter of said insulated gate bipolar transistor by said first control switching element through said second diode.

5. An electronic flash unit according to claim 3, wherein said control switch means further includes:

a fifth control switching element having a control electrode and main electrodes connected across the voltage output terminal of said drive power source and the gate of said insulated gate bipolar transistor;

a third diode having an anode connected to a control electrode of said fifth control switching element and a cathode connected to the anode of said third control switching element in said control series connection; and a resistor connected across the voltage output terminal of said drive power source and the control electrode of said fifth control switching element, and wherein said control switch means controls supply of on-voltage from the voltage output terminal of said drive power source to the gate of said insulated gate bipolar transistor in accordance with an operating state of said third control switching element.

* * * * *